(12) United States Patent
Ito et al.

(10) Patent No.: US 10,485,175 B2
(45) Date of Patent: Nov. 26, 2019

(54) GRASS MOWER

(71) Applicant: Kubota Corporation, Osaka (JP)

(72) Inventors: Hirokazu Ito, Osaka (JP); Kazuo Koike, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/958,251

(22) Filed: Apr. 20, 2018

(65) Prior Publication Data

US 2018/0235149 A1    Aug. 23, 2018

Related U.S. Application Data

(63) Continuation of application No. 15/164,075, filed on May 25, 2016, now Pat. No. 9,949,436.

(30) Foreign Application Priority Data

Jul. 13, 2015   (JP) .................................. 2015-139890

(51) Int. Cl.
| | | |
|---|---|---|
| A01D 69/02 | (2006.01) | |
| A01D 34/78 | (2006.01) | |
| A01D 34/73 | (2006.01) | |
| A01D 34/74 | (2006.01) | |
| A01D 34/81 | (2006.01) | |

(52) U.S. Cl.
CPC ............ *A01D 69/02* (2013.01); *A01D 34/73* (2013.01); *A01D 34/74* (2013.01); *A01D 34/78* (2013.01); *A01D 34/81* (2013.01); *A01D 69/025* (2013.01)

(58) Field of Classification Search
CPC ........ A01D 34/78; A01D 34/81; A01D 69/02; A01D 69/025
See application file for complete search history.

(56) References Cited

U.S. PATENT DOCUMENTS

| | | | |
|---|---|---|---|
| 2,763,116 A | | 9/1956 | Flinchbaugh et al. |
| 2,991,612 A | * | 7/1961 | Holmes ................ A01D 34/661 56/11.4 |
| 6,065,274 A | * | 5/2000 | Laskowski ............. A01D 34/76 56/11.6 |
| 6,182,428 B1 | | 2/2001 | Hatfield |
| 6,826,895 B2 | * | 12/2004 | Iida ........................ A01D 34/78 56/11.9 |
| 8,042,322 B1 | | 10/2011 | Wyatt |

(Continued)

FOREIGN PATENT DOCUMENTS

| | | |
|---|---|---|
| DE | 10230788 A1 | 2/2004 |
| JP | 2008263920 A | 11/2008 |

(Continued)

*Primary Examiner* — Alicia Torres

(74) *Attorney, Agent, or Firm* — The Webb Law Firm

(57) ABSTRACT

A grass mower is provided with a plurality of rotating shafts passing through a ceiling wall of a mower deck and extending upward, disposed in a side-by-side state; cutting blades respectively linked to the rotating shafts in an internal space of the mower deck; an electric motor mounted at a location to the lateral outside relative to a rotation path of the cutting blades within the mower deck, and having an output shaft extending upward; and a power transmission mechanism positioned above the ceiling wall of the mower deck, and configured to transmit power from the output shaft to the rotating shafts of the cutting blades.

12 Claims, 8 Drawing Sheets

(56) References Cited

U.S. PATENT DOCUMENTS

| | | |
|---|---|---|
| 8,191,343 B1 | 6/2012 | Hauser et al. |
| 8,572,939 B2 | 11/2013 | Koike et al. |
| 2002/0053194 A1 | 5/2002 | Bergsten et al. |
| 2008/0264026 A1 | 10/2008 | Ishii et al. |
| 2014/0259804 A1 | 9/2014 | Eavenson, Sr. et al. |
| 2015/0048700 A1 | 2/2015 | Liu et al. |

FOREIGN PATENT DOCUMENTS

| | | |
|---|---|---|
| JP | 2008265685 A | 11/2008 |
| JP | 2012187026 A | 10/2012 |
| JP | 2013063055 A | 4/2013 |
| JP | 2013063092 A | 4/2013 |
| WO | 2014089978 A1 | 6/2014 |

\* cited by examiner

GRASS MOWER

CROSS-REFERENCE TO RELATED APPLICATIONS

This application is a continuation of U.S. patent application Ser. No. 15/164,075, filed May 25, 2016, issued as U.S. Pat. No. 9,949,436, which claims priority to Japanese Patent Application No. 2015-139890 filed Jul. 13, 2015, the disclosures of which are hereby incorporated in their entireties by reference.

BACKGROUND OF THE INVENTION

Field of the Invention

The present invention relates to a grass mower.

Background Art

A vehicle described in U.S. Pat. No. 8,042,322B1 is provided with a mower deck, a plurality of rotating shafts supported side-by-side in the mower deck and extending in the vertical direction, and cutting blades respectively fixed at lower ends of the rotating shafts. An electric motor for rotationally driving each cutting blade is mounted between two rotating shafts in the upper wall face of the mower deck. An output shaft of the electric motor extends in the horizontal direction toward each rotating shaft from both lateral sides of the electric motor. Each output shaft and each rotating shaft are respectively linked with bevel gears. Each cutting blade is rotationally driven by the electric motor. When this sort of configuration is adopted in a mower provided with a mower deck installed to a vehicle body such that ground height can be changed through a raising/lowering mechanism, for example when raising/lowering the mower deck, there is a risk that the electric motor, bevel gears, or the like protruding upward from a ceiling wall of the mower deck will interfere with the vehicle body, so it is difficult to adequately secure the ground height of the mower deck. On the other hand, when the height of the vehicle body is set too high in order to secure the ground height of the mower deck, the problem occurs that the center of gravity of the vehicle becomes high.

Also, a lawn tractor (lawn mower) described in U.S. Pat. No. 8,191,343B1 is provided with a mower deck having three cutting blades disposed in a row. An output shaft of an electric motor is linked to an upper end of a center rotating shaft having a center cutting blade installed to its lower end. A left rotating shaft to which a left cutting blade is installed, and a right rotating shaft to which a right cutting blade is installed, respectively, receive power from the center rotating shaft through belt transmission. The electric motor that rotationally drives each cutting blade is disposed at a highest position of the mower deck. A controller that supplies electric power to the electric motor is disposed in an area surrounded by the center rotating shaft, the left rotating shaft, and the right rotating shaft on the ceiling wall of the mower deck. The ground height of the controller is less than the ground height of the electric motor. In this lawn tractor as well, the electric motor is disposed at the upper end of the center rotating shaft, so for example when raising/lowering the mower deck, there is a risk that the electric motor or the like will interfere with the vehicle body, so it is difficult to adequately secure the ground height of the mower deck.

Also, an electric lawn mower described in U.S. Pat. No. 8,572,939B2 is provided with a mower deck having three cutting blades disposed in a row. Electric motors corresponding to the respective cutting blades are disposed at upper ends of rotating shafts of all of the cutting blades. Power supply to each electric motor is performed by a power supply system including an inverter and a battery mounted in a vehicle body. In this electric lawn mower as well, for example when raising/lowering the mower deck, there is a risk that each electric motor or the like will interfere with the vehicle body, so it is difficult to adequately secure the ground height of the mower deck.

As described above, in a conventional mower deck, a cutting blade driving device having height, such as a gear mechanism or an electric motor, is disposed on the upper part of a rotating shaft of a cutting blade. Therefore, it is difficult to adequately secure the raising/lowering stroke of the mower deck.

For the reasons as described above, a grass mower is desired in which an adequate space can be secured between the bottom of a vehicle body and a rotating shaft of a cutting blade supported by a mower deck.

SUMMARY OF THE INVENTION

The present invention provides a grass mower, including:
a vehicle body;
a raising/lowering mechanism;
a mower deck installed to the vehicle body so as to be capable of changing ground height through the raising/lowering mechanism, having a ceiling wall, and configured to create an internal space between the mower deck and the ground;
a plurality of rotating shafts passing through the ceiling wall and extending upward, disposed in a side-by-side state;
cutting blades respectively linked to the rotating shafts in the internal space;
an electric motor mounted at a location to the lateral outside relative to a rotation path of the cutting blades within the mower deck, and having an output shaft extending upward;
a power transmission mechanism positioned above the ceiling wall, and configured to transmit power from the output shaft to the rotating shafts; and
a power supply unit configured to supply electrical power to the electric motor.

According to the present invention, a portion within the mower deck configured for mounting of the electric motor is positioned to the lateral outside of the rotation path of the plurality of cutting blades, so the height of the electric motor above the ground can be lowered without concern for the presence of the cutting blades. Thus, an adequate height is secured between the electric motor and the vehicle body, and as a result, an adequate ground height of the mower deck can be secured. In this case, power transmission from the output shaft of the electric motor to the rotating shaft of each cutting blade is performed with a power transmission mechanism positioned above the ceiling wall of the mower deck, so it is preferable to use a power transmission mechanism having a low height.

In the present invention, it is suitable to provide the below configuration,
wherein a motor mounting face configured to be mounted to the mower deck is provided at a lower end portion of the electric motor, and the motor mounting face has a lower ground height than the ceiling wall.

In the present invention, it is suitable to provide the below configuration, wherein a side wall extending downward from an outer circumferential edge of the ceiling wall, and a mounting base extending to the outside from the side wall, are provided in the mower deck, and the electric motor is mountable to the mounting base.

In the present invention, it is suitable to provide the below configuration, wherein a horizontal first mounted face is provided in the mounting base, and the motor mounting face is in contact with the first mounted face such that heat can be conducted.

In the present invention, it is suitable to provide the below configuration, wherein an inverter unit is provided in the power supply unit, and the inverter unit is mounted to the side wall or the mounting base.

In the present invention, it is suitable to provide the below configuration, wherein an inverter mounting face configured to be mounted to the mower deck is provided in the inverter unit, a second mounted face is provided in the side wall or the mounting base, and the inverter mounting face is fixed in a state in contact with the second mounted face such that heat can be conducted.

In the present invention, it is suitable to provide the below configuration, wherein a battery configured to be provided in the vehicle body is provided in the power supply unit, the grass mower further including a connector unit of a power cable configured to connect the inverter unit to the battery, the connector unit being installed to the mounting base.

In the present invention, it is suitable to provide the below configuration, wherein the mounting base is disposed at the periphery of a location where sucked-in air produced by rotation of the cutting blades flows.

In the present invention, it is suitable to provide the below configuration, wherein in an area to the rear of the side wall, a usable space is provided bordered by a plurality of circular arc portions following the rotation path and a straight portion between the circular arc portions, and the electric motor is disposed in the usable space.

In the present invention, it is suitable to provide the below configuration, wherein a water jacket is provided in the electric motor, and an electric cooling pump configured to supply cooling water to the water jacket is provided in the vehicle body.

In the present invention, it is suitable to provide the below configuration, wherein a cooling water channel is provided in the inverter unit, and an electric cooling pump configured to supply cooling water to the cooling water channel is provided in the vehicle body.

In the present invention, it is suitable to provide the below configuration, wherein the power transmission mechanism is a belt transmission mechanism, and the belt transmission mechanism is provided with driven pulleys respectively provided at the upper ends of the plurality of rotating shafts, a driving pulley provided at the upper end of the output shaft, and a belt wound around the driven pulleys and the driving pulley.

DETAILED DESCRIPTION OF THE PREFERRED EMBODIMENTS

Prior to describing a specific embodiment of a grass mower according to the present invention, the basic structure of a mower unit 3 mounted in this grass mower will be described with reference to FIGS. 1 and 2.

Figure 1:
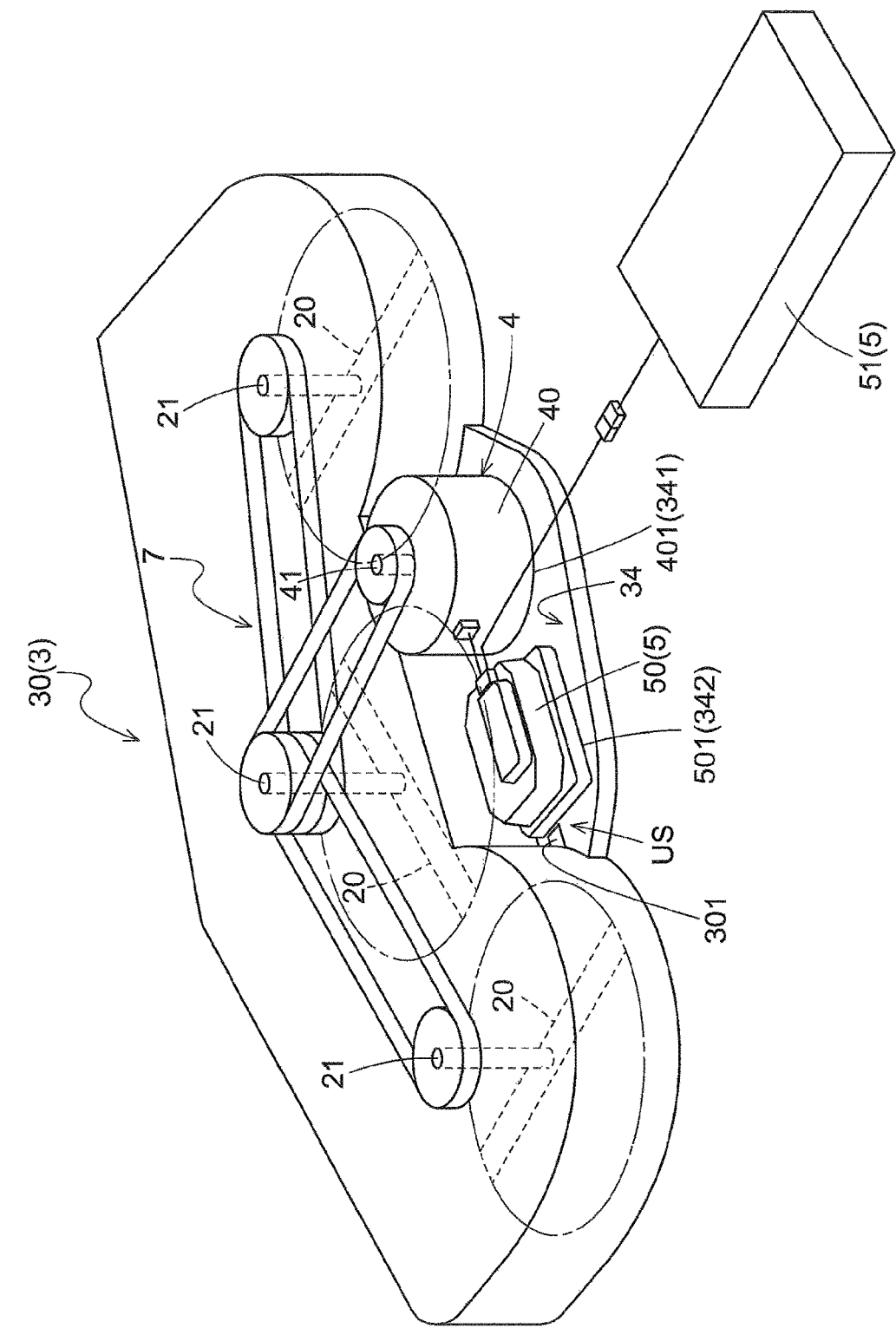
FIG. 1 is a perspective view schematically showing the basic structure of a mower unit mounted in a grass mower according to the present invention.

The grass mower is provided with a vehicle body 10, a raising/lowering mechanism not shown in FIG. 1, and a mower deck 30. The mower deck 30 is suspended from the vehicle body 10 by the raising/lowering mechanism. In a state where the mower deck 30 has been suspended from the vehicle body 10, an internal space is created that is open toward the ground. That is, the mower deck 30 is installed to the vehicle body 10 such that ground height can be changed through the raising/lowering mechanism, and is configured to create an internal space between the mower deck 30 and the ground.

The mower deck 30 has a ceiling wall 31. A plurality of cutting blades 20 are housed in the internal space created with the mower deck 30. The cutting blades 20 are respectively fixed linked to lower ends of rotating shafts 21 that pass through the ceiling wall 31 of the mower deck 30 and extend upward. Preferably, the rotating shafts 21 respectively extend in a vertical direction orthogonal to the ceiling wall 31.

In the example shown in FIG. 1, the mower deck 30 is a three-blade-type mower deck in which a left-side cutting blade 20, a center cutting blade 20, and a right-side cutting blade 20 are disposed side-by-side in the transverse direction of the vehicle body. The left-side cutting blade 20, the center cutting blade 20, and the right-side cutting blade 20 are disposed side-by-side in the transverse direction of the vehicle body, within the internal space of the mower deck 30. The center cutting blade 20 protrudes in the forward direction of the vehicle body relative to the left-side cutting blade 20 and the right-side cutting blade 20. The center rotating shaft 21 protrudes in the forward direction of the vehicle body relative to the left-side rotating shaft 21 and the right-side rotating shaft 21.

Thus, in the internal space of the mower deck 30, in a plan view, a dead space is created outside of the rotation path of the three cutting blades 20, specifically on the side in the rearward direction of the vehicle body. As shown in FIG. 2, in a plan view, this dead space is located to the rear of the rotation path of the center cutting blade 20, and on the right side of the rotation path of the left-side cutting blade 20, and on the left side of the rotation path of the right-side cutting blade 20. By configuring a wall of the mower deck 30 to cut into this dead space, a usable space US is formed in a center rear portion of the mower deck 30.

Figure 2:
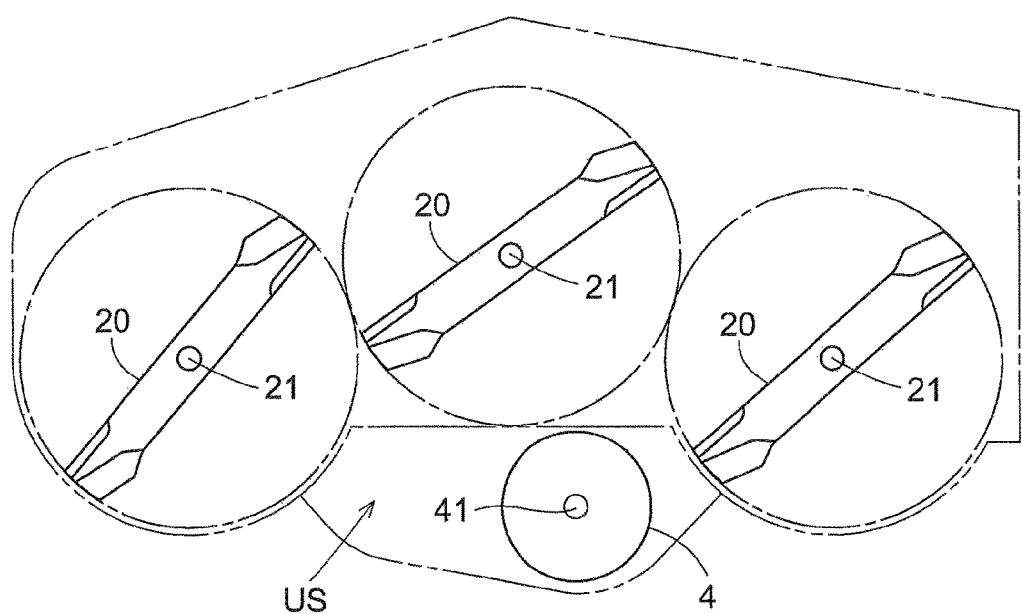
FIG. 2 is a plan view schematically showing the position of a rotation path of cutting blades relative to an electric motor.

As shown in FIGS. 1 and 2, an electric motor 4 is disposed in the usable space US. The electric motor 4 is disposed in an orientation such that an output shaft 41 of the electric motor 4 points upward. The output shaft 41 preferably is disposed in an orientation pointing in the vertical direction.

As shown in FIG. 1, the output shaft 41 of the electric motor 4 protrudes upward from an upper face of a motor housing 40. Power transmission from the output shaft 41 of the electric motor 4 to each rotating shaft 21 is performed by a power transmission mechanism 7 positioned above the ceiling wall 31 of the mower deck 30. The power transmission mechanism 7 extends above the ceiling wall 31.

A motor mounting face 401 is provided in a lower face of the motor housing 40. The electric motor 4 is fixed to a mounting base 34 provided in the mower deck 30. A first mounted face 341 is provided in the upper face of the mounting base 34. The motor mounting face 401 of the motor housing 40 is in contact with the first mounted face 341 of the mounting base 34 such that heat can be conducted.

Thus, the mounting base 34 of the mower deck functions as a heat sink of the electric motor 4 when the mower deck 30 is cooled by a cut grass transporting wind that occurs due to rotational driving of the cutting blades 20.

Specifically, there is a large flow amount of the transporting wind by the cutting blades 20 in the rear portion of the internal space of the mower deck 30, so there is a large cooling effect in a side wall portion positioned in the rear portion of the internal space of the mower deck 30. Therefore, it is convenient for that side wall portion and the mounting base 34 to be connected such that heat can be conducted.

In order to secure an adequate raising/lowering stroke of the mower deck 30, it is preferable that the height of the power transmission mechanism 7, which is positioned above the ceiling wall 31, is as low as possible. Therefore, a belt transmission mechanism is preferably adopted for the power transmission mechanism 7.

As shown in FIG. 1, an inverter unit 50, which is one constituent element of a power supply unit 5 that supplies electrical power to the electric motor 4, is also disposed in the usable space US. An inverter mounting face 501 is provided in a lower face of the inverter unit 50. A second mounted face 342 is provided in an upper face in the vicinity of a side wall portion of the mower deck 30. In the example shown in FIG. 1, the inverter unit 50 is fixed such that the inverter mounting face 501 of the inverter unit 50 is in contact with the second mounted face 342 of the mower deck 30 such that heat can be conducted.

Accordingly, the mower deck 30 functions also as a heat sink of the inverter unit 50. The inverter unit 50 may also be mounted to a side wall portion of the mower deck 30, rather than the upper face in the vicinity of a side wall portion of the mower deck 30 (a ceiling wall portion a step below the ceiling wall 31, and the bottom face of the usable space US).

One side of the inverter unit 50 is connected to the electric motor 4, and another side is connected through a power cable 57 to a battery 51, which is one constituent element of the power supply unit 5.

As shown in FIG. 1, an opening 301 is provided in a portion of the mounting base 34. Air sucked into the mower deck 30, generated by rotational driving of the cutting blades 20, flows through the vicinity of the electric motor 4 and the inverter unit 50 through the opening 301 of the mounting base 34. Thus, it is possible to increase the cooling effect for the electric motor 4 and the inverter unit 50. Note that a configuration may also be adopted in which such an opening 301 is not provided.

A water jacket not shown is provided in the motor housing 40. In this case, the inverter unit 50 may be mounted in the vicinity of the water jacket of the motor housing 40. A configuration may also be adopted in which a cooling water channel is further provided in the inverter unit 50, and cooling water is supplied to the cooling water channel from the water jacket of the motor housing 40. Note that a configuration may also be adopted in which such a water jacket or the like is not provided.

Figure 3:
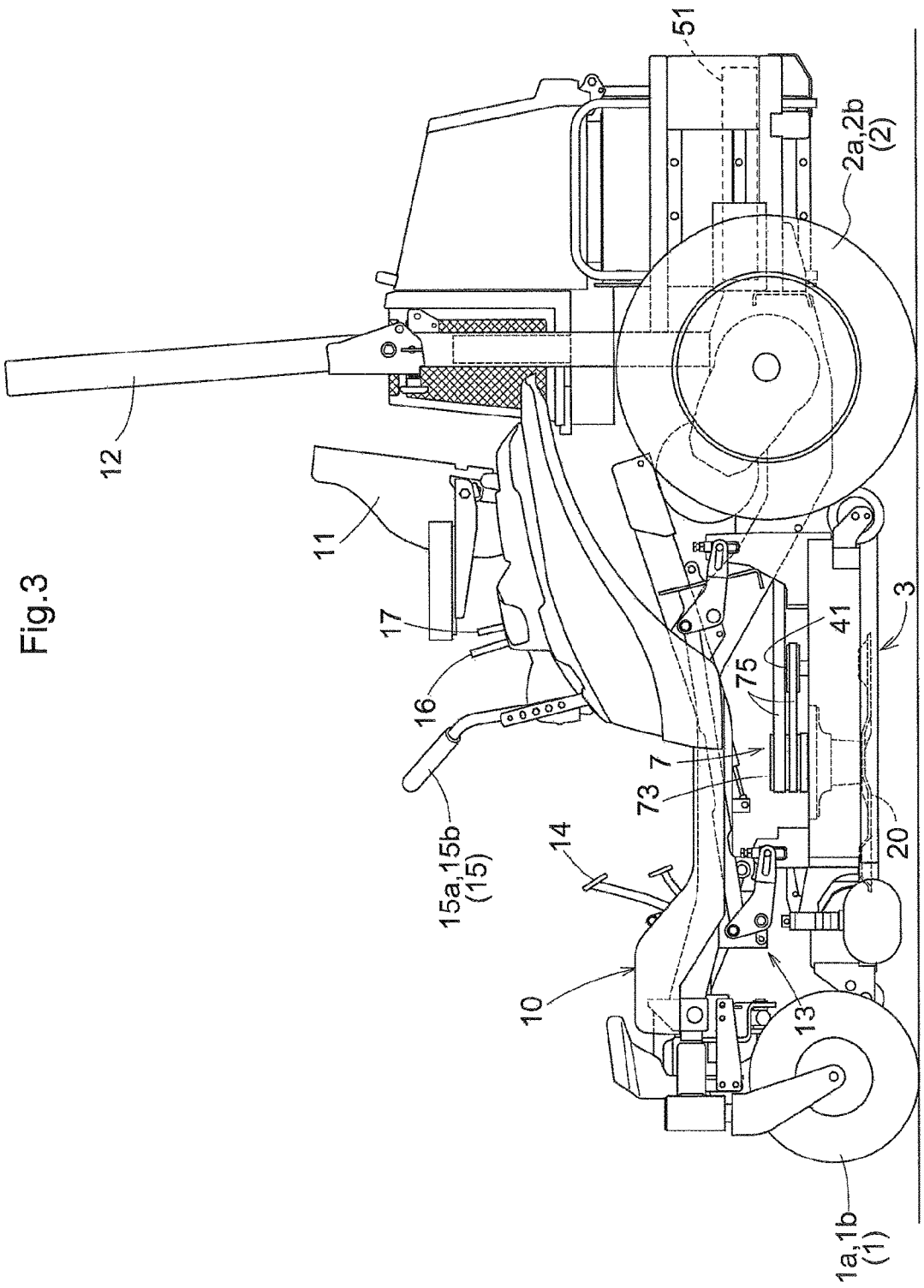
FIG. 3 is a side view of a mid-mount-type riding electric grass mower serving as one embodiment of a grass mower.

Next is a description of a specific embodiment of a grass mower according to the present invention, with reference to FIGS. 3 to 7 in the drawings. FIG. 3 is a side view of a mid-mount-type riding electric grass mower serving as one example of a grass mower.

This grass mower is provided with a front wheel unit 1 including a left front wheel 1a and a right front wheel 1b that are freely rotatable caster-type wheels, a driving wheel unit 2 including a left rear wheel 2a and a right rear wheel 2b, the vehicle body 10 supported by the front wheel unit 1 and the driving wheel unit 2, the mower unit 3, and a raising/lowering mechanism 13. This grass mower is also provided with the battery 51 disposed in the rear portion of the vehicle body 10, a driver seat 11 disposed to the front of the battery 51, and a rollover protection frame 12 provided standing from the rear of the driver seat 11. The mower unit 3 is suspended from the vehicle body 10 such that the mower unit 3 can be raised/lowered through a raising/lowering linkage mechanism serving as the raising/lowering mechanism 13 in a space below the vehicle body 10 between the front wheel unit 1 and the driving wheel unit 2.

A floor plate serving as a foot rest for the driver is provided to the front of the driver seat 11. A brake pedal 14 protrudes from this floor plate. A control unit 15 including a left control lever 15a and a right control lever 15b that swing around a horizontal swinging axis in the transverse direction of the vehicle body is disposed on both sides of the driver seat 11. A cutting blade control lever 16 and a mower unit raising/lowering pedal 17 are disposed at the periphery of the driver seat 11. Note that instead of using a control lever, a control switch may be substituted for the cutting blade control lever 16. Also, instead of using a raising/lowering pedal, a raising/lowering lever may be substituted for the mower unit raising/lowering pedal 17.

Figure 4:
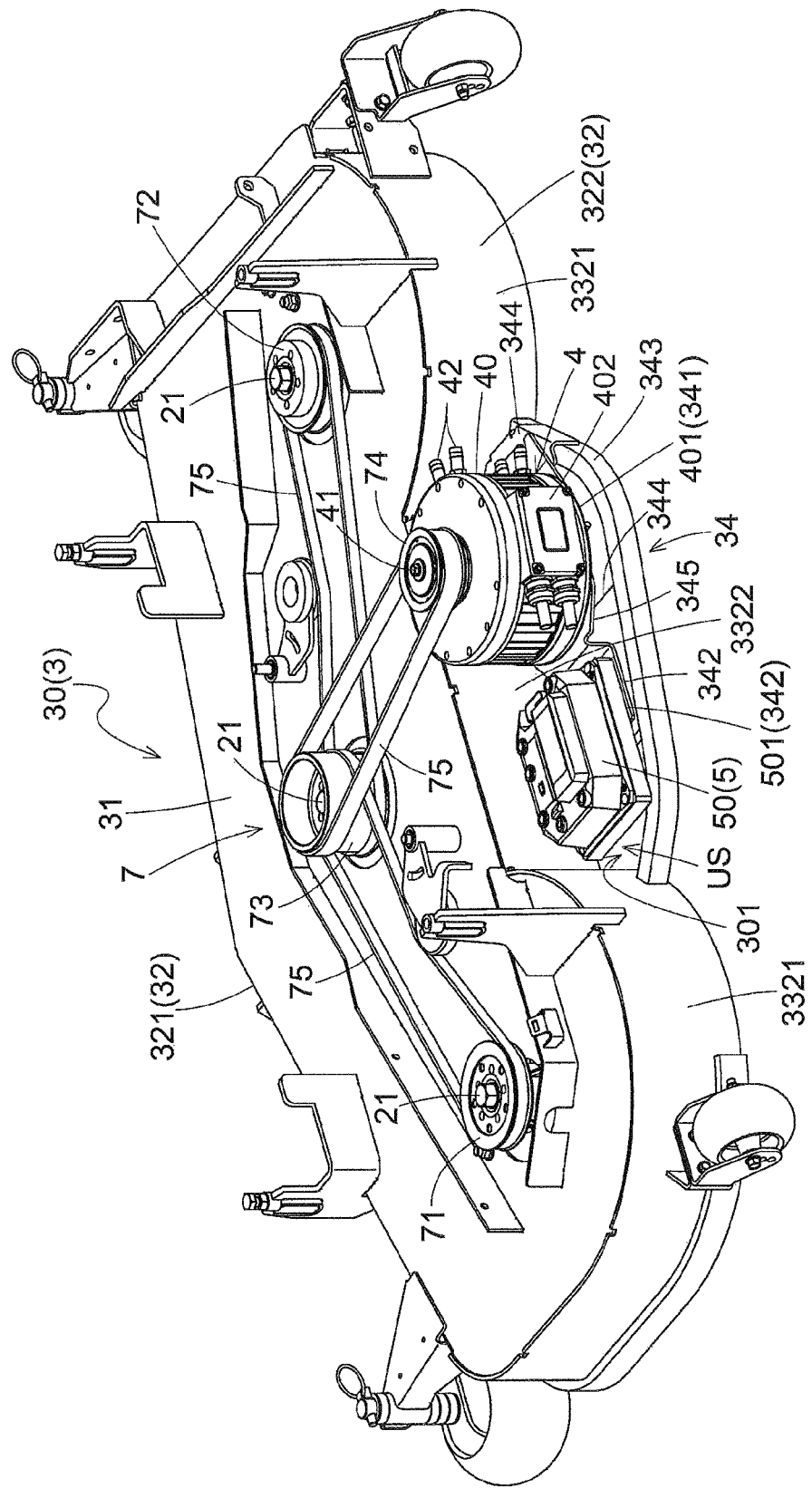
FIG. 4 is a perspective view of the mower unit.
Figure 5:
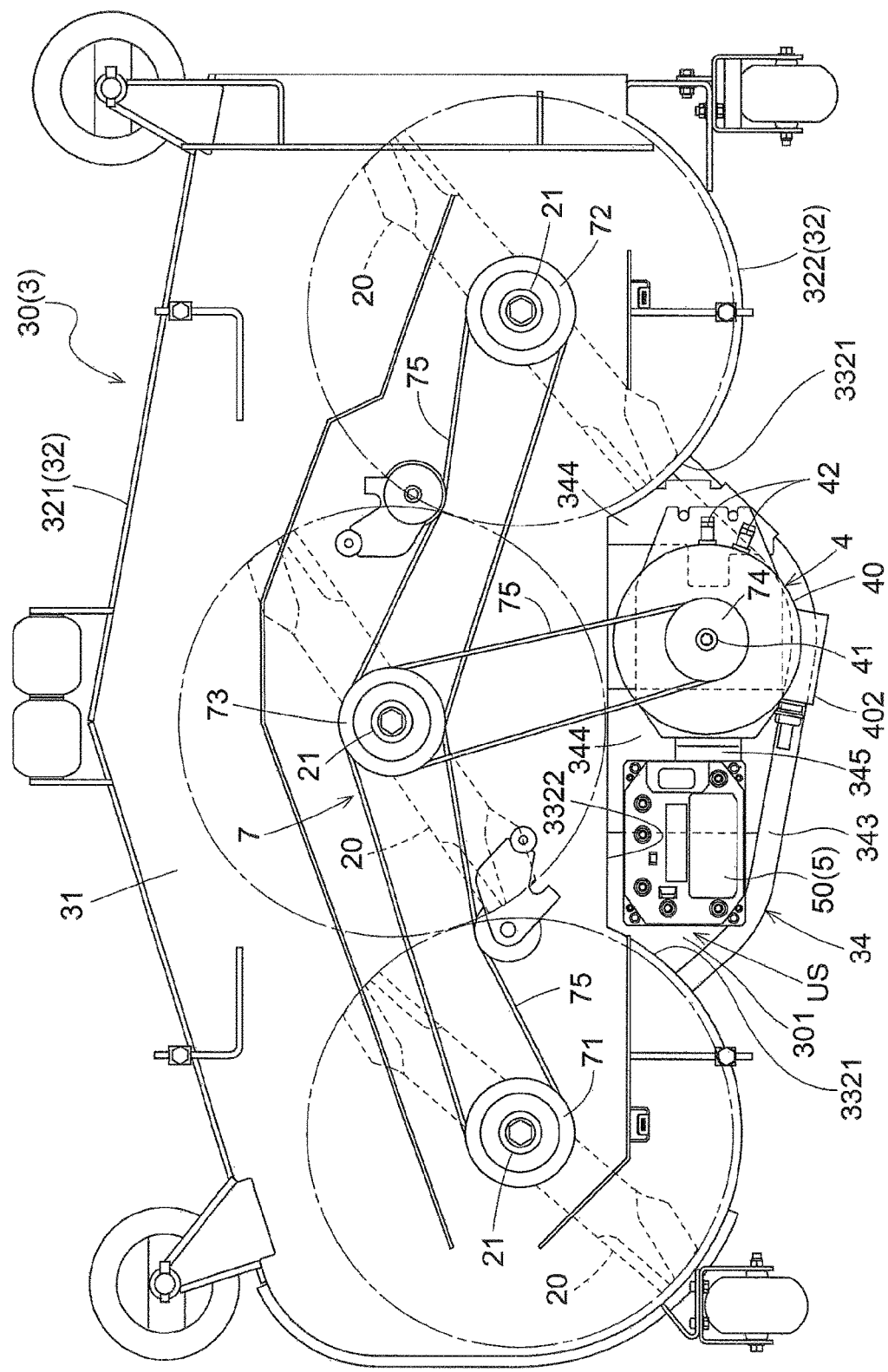
FIG. 5 is a plan view of the mower unit.
Figure 6:
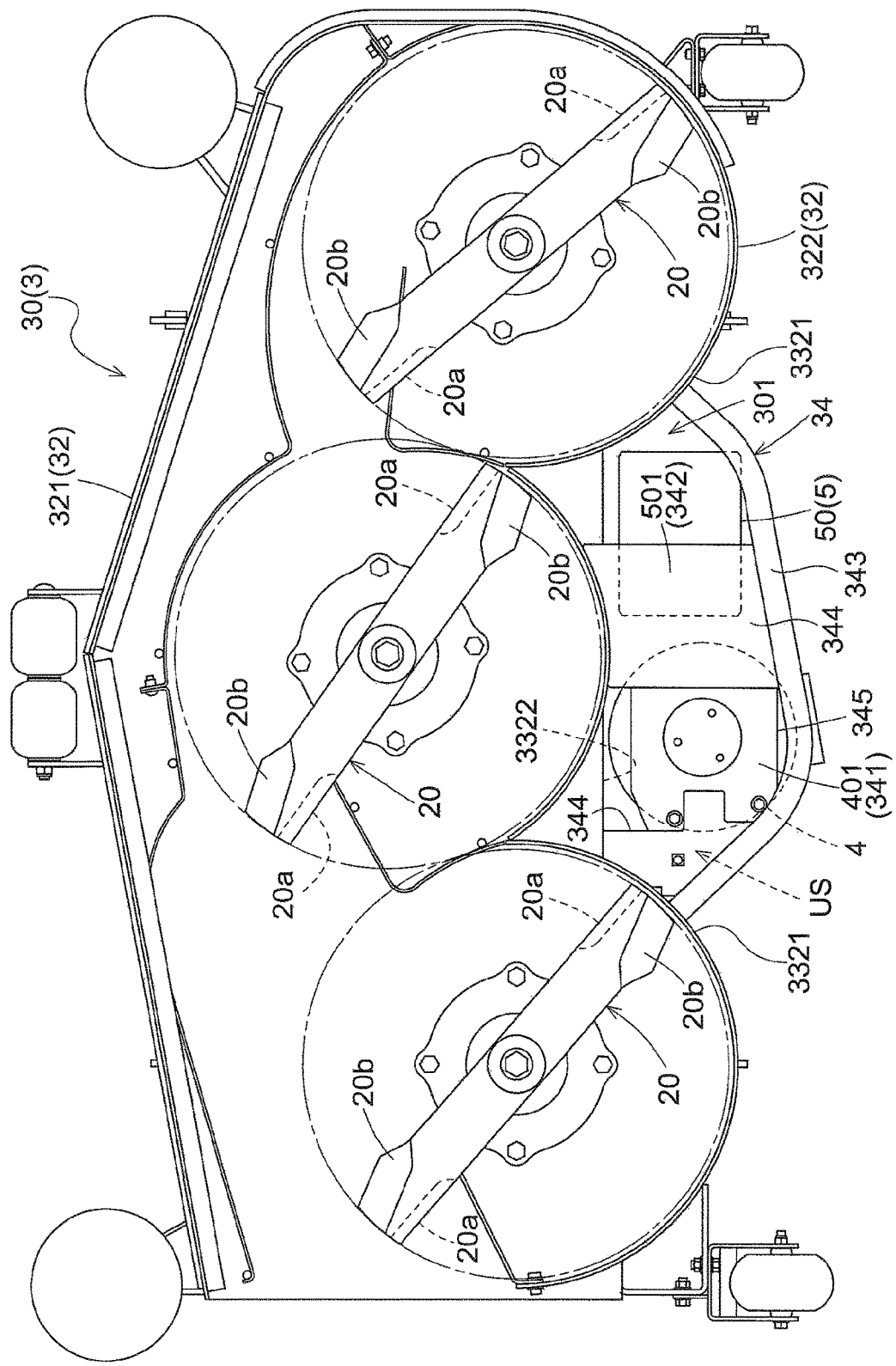
FIG. 6 is a back view of the mower unit.

As shown in FIGS. 4 to 6, the mower unit 3 is a side-discharge-type mower unit having three cutting blades. The mower unit 3 is provided with the mower deck 30 and the three rotating cutting blades 20.

The mower deck 30 is provided with the ceiling wall 31, a side wall 32 extending downward from the outer circumferential edge of the ceiling wall 31, and the mounting base 34 extending to the outside from the side wall 32. The side wall 32 preferably extends perpendicularly downward from the outer circumferential edge of the ceiling wall 31. That is, the mower deck 30 is installed to the vehicle body 10 such that the ground height of the mower deck 30 can be changed through the raising/lowering mechanism 13, the mower deck 30 has the ceiling wall 31, and an internal space is created between the mower deck 30 and the ground.

The side wall 32 is provided with a front side wall 321 extending downward from the outer circumferential edge of the front ceiling wall 31, and a rear side wall 322 extending downward from the outer circumferential edge of the rear ceiling wall 31. A cut grass discharge opening capable of discharging cut grass is provided in a right end area of the side wall 32.

In a plan view, following the rotation path of the three adjacent cutting blades 20, the rear side wall 322 has two circular arc portions 3321 on the left and right, and a straight portion 3322 that connects the circular arcs of the two circular arc portions 3321 in a straight line.

In an area to the rear of the rear side wall 322, a space created between the two circular arc portions 3321 and the straight portion 3322 can be used as the usable space US. That is, in an area to the rear of the side wall 32 of the mower deck 30, the usable space US is provided bordered by the plurality (two in this embodiment) of circular arc portions 3321 following the rotation path of the cutting blades 20 and the straight portion 3322 between the circular arc portions 3321. The electric motor 4 is disposed in the usable space US.

The power supply unit 5 that supplies electrical power to the electric motor 4 is provided in the vehicle body 10. The power supply unit 5 is provided with the inverter unit 50 and the battery 51 provided in the vehicle body 10.

In this embodiment, as shown in FIGS. 4 to 7, the vertically placed electric motor 4 that functions as a cutting blade motor, and the inverter unit 50 that supplies electrical power to the electric motor 4, are disposed in the usable space US. The mounting base 34 serving as a sub-deck is provided in the usable space US. The electric motor 4 can be mounted to the mounting base 34. As shown in FIG. 4 for example, the mounting base 34 is disposed at a location that is lower than the ceiling wall 31 by about the height of the electric motor 4. The mounting base 34 extends to the outside from the rear side wall 322.

The mounting base 34 is provided with a rod-like support frame 343 that links the left-side circular arc portion 3321 and the right-side circular arc portion 3321 of the rear side wall 322, a bridge plate 344 that connects the support frame 343 to the straight portion 3322 of the rear side wall 322, and a plate-like mounting bracket 345. The mounting bracket 345 is joined to the support frame 343 and the bridge plate 344. The mounting base 34 is disposed at the periphery of a location where sucked-in air produced by rotation of the cutting blades 20 flows.

The mounting bracket 345 of the mounting base 34 is provided with the first mounted face 341 and the second mounted face 342 that have a height difference relative to each other and extend horizontally.

The electric motor 4 is provided with the cylindrical motor housing 40, and the output shaft 41 extending upward from the motor housing 40. In this embodiment, the output shaft 41 extends perpendicularly upward.

The motor mounting face 401 is provided at a lower end portion of the motor housing 40. That is, the motor mounting face 401 configured to be mounted to the mower deck 30 is provided at a lower end portion of the electric motor 4. The motor mounting face 401 has a lower ground height than the ceiling wall 31 of the mower deck 30. The motor mounting face 401 makes surface contact with the first mounted face 341 in a state where the electric motor 4 has been mounted to the mounting base 34. That is, the motor mounting face 401 is in contact with the first mounted face 341 such that heat can be conducted.

In this embodiment, the inverter unit 50 is mounted to the mounting base 34. The inverter mounting face 501 configured to be mounted to the mower deck 30 is provided in a lower face of a rectangular-shaped housing of the inverter unit 50. In this embodiment, the second mounted face 342 is provided in the mounting base 34. The inverter mounting face 501 makes surface contact with the second mounted face 342 in a state where the inverter unit 50 has been mounted to the mounting base 34. That is, the inverter mounting face 501 is fixed in a state in contact with the second mounted face 342 such that heat can be conducted.

Thus, the mower deck 30 as a whole, which includes the mounting base 34 made of steel plate, functions as a heat sink of the electric motor 4 and the inverter unit 50.

A water jacket is provided in the electric motor 4. This water jacket is provided in the motor housing 40 of the electric motor 4. An electric cooling pump 45 that supplies cooling water to this water jacket is provided in the vehicle body 10. As shown in FIGS. 4 and 5, cooling water vent ports 42 protrude from the circumferential face of the cylindrical motor housing 40. A communicating hose, a supply hose, and a drain hose are connected to the vent ports 42. Cooling water is supplied to the water jacket by the electric cooling pump 45, as schematically shown in FIG. 7.

A cooling water channel is provided in the inverter unit 50. Cooling water is supplied to the cooling water channel of the inverter unit 50 by driving of the electric cooling pump 45 configured to supply cooling water to the water jacket of the electric motor 4. That is, the electric cooling pump 45 configured to supply cooling water to the cooling water channel of the inverter unit 50 is provided in the vehicle body 10.

As shown in FIGS. 4 to 6, a power supply box 402 is provided in the circumferential face of the motor housing 40. The power supply box 402 is connected to the inverter unit 50 by a power cable not shown here.

Figure 7:
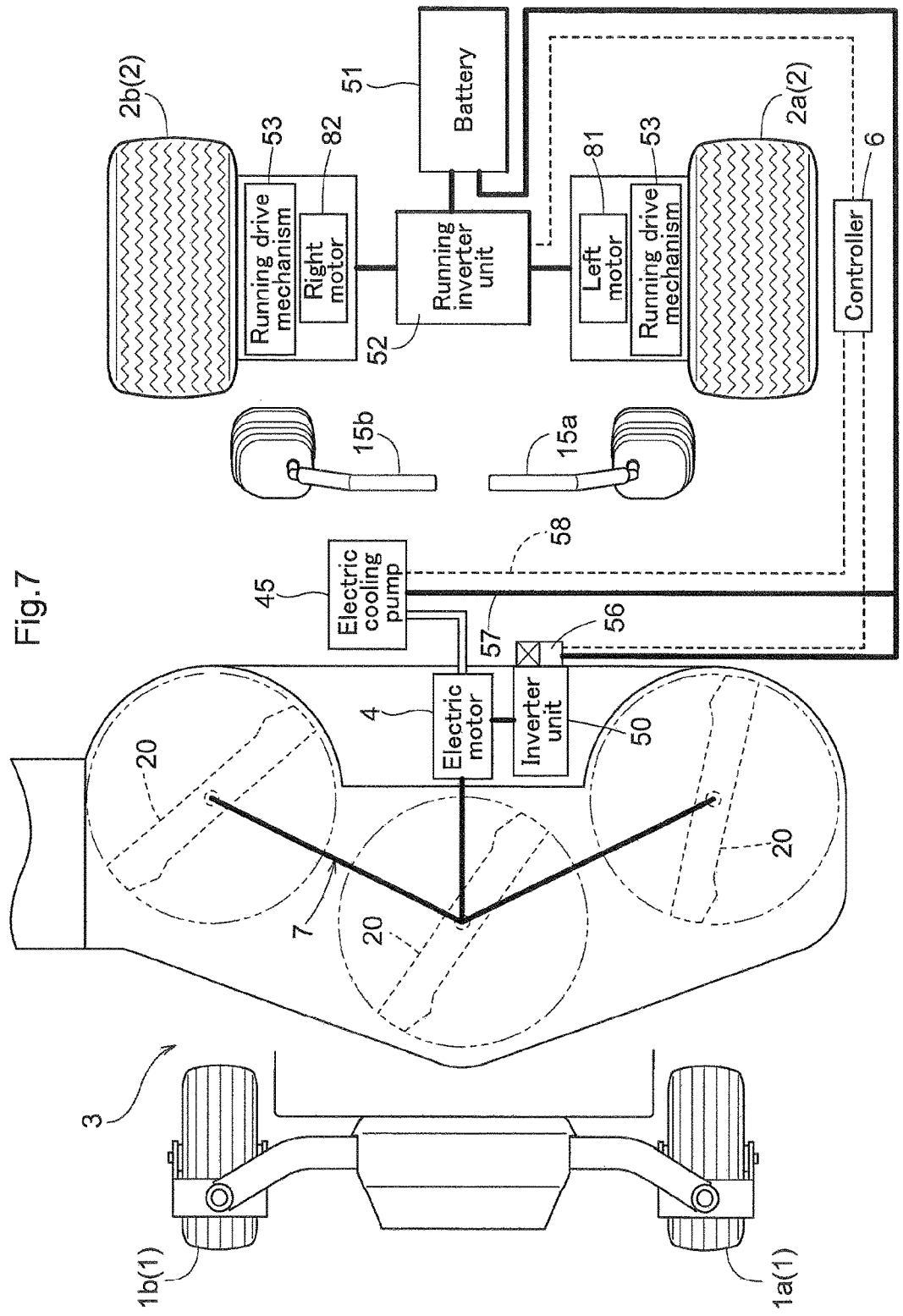
FIG. 7 illustrates an electrical system and a power system of the grass mower.

Supply of electrical power from the battery 51 mounted in the vehicle body 10 to the inverter unit 50, as schematically shown in FIG. 7, is performed through a connector unit 56 provided in the inverter unit 50 and the power cable 57 connectable to the connector unit 56. The connector unit 56 is installed to the mounting base 34. Also, the power cable 57 configured to be connected to the connector unit 56 connects the inverter unit 50 to the battery 51.

A controller 6, known as an ECU, is provided in the vehicle body 10. Transmission of control signals from the controller 6 to the inverter unit 50 is performed through a control signal line 58.

The connector unit 56 is also used for connection of the control signal line 58. The connector unit 56 is provided with a receiving member protruding to the rear of the inverter unit 50, and an insertion member connected to a terminal of the power cable 57 or the control signal line 58. A connection portion (a socket or a plug) of the receiving member of the connector unit 56 is directed outward in the transverse direction of the vehicle body (the width direction of the vehicle body). Accordingly, the insertion member of the connector unit 56 is brought near the connection portion of the receiving member in the transverse direction of the vehicle body from the side of the vehicle body 10, and the connection portion (the plug or the socket) of the insertion member of the connector unit 56 is ultimately inserted to the connection portion of the receiving member of the connector unit 56. Below the vehicle body 10, various devices are disposed, so there is little space. On the other hand, there is some space between the rear of the mower deck 30 and the driving wheel unit 2 (rear wheels). Therefore, by disposing the connector unit 56 as described above, the connection and removal of the connector unit 56 can easily be performed. As the connector unit 56, it is preferable to adopt a one-touch operation-type connector, which is known as a quick coupler.

The respective cutting blades 20 are fixed to the rotating shafts 21 passing through the ceiling wall 31. Each cutting blade 20 is linked to a rotating shaft 21 in the internal space of the mower deck 30. A single-type first pulley 71 is provided at the upper end of the left rotating shaft 21. A single-type second pulley 72 is provided at the upper end of the right rotating shaft 21. A triple-type third pulley 73 is provided at the upper end of the center rotating shaft 21.

The electric motor 4 is mounted at a location to the lateral outside relative to the rotation path of the cutting blades 20 in the mower deck 30. The electric motor 4 has the output shaft 41 extending upward. A single-type fourth pulley 74 is provided at the upper end of the output shaft 41 of the electric motor 4. A belt 75 is wound around the fourth pulley 74 and the third pulley 73, around the third pulley 73 and the first pulley 71, and around the third pulley 73 and the second pulley 72.

The fourth pulley 74 is a driving pulley. The first pulley 71, the second pulley 72, and the third pulley 73 each are driven pulleys. The power transmission mechanism 7 that transmits power of the electric motor 4 to the cutting blades 20 is constructed as a belt transmission mechanism by the fourth pulley 74, the first pulley 71, the second pulley 72, the third pulley 73, and the belts 75. That is, the power transmission mechanism 7 is positioned above the ceiling wall 31, and transmits power from the output shaft 41 of the electric motor 4 to each rotating shaft 21.

The power transmission mechanism 7 is positioned above the ceiling wall 31 of the mower deck 30. The power transmission mechanism 7 is a pulley transmission mechanism with a horizontal orientation, so the height of the ceiling wall 31 of the mower deck 30 is kept to less than the height of a gear transmission mechanism or the like.

A plurality (three in this embodiment) of rotating shafts 21 are disposed side-by-side. Each rotating shaft 21 extends upward passing through the ceiling wall 31. The three rotating shafts 21 each are rotatably supported by the ceiling wall 31 using bearings.

A cutting blade tip 20a is provided at both ends of the band-shaped cutting blade 20. A wind-generating vane 20b is provided at a rear side of each cutting blade tip 20a in the cutting blade 20. When performing grass-cutting work in which the grass mower is caused to run while rotationally driving the cutting blades 20, cut grass that has been severed by the cutting blades 20 is guided by a baffle plate within the mower deck 30 and passed through the inside of the mower deck 30 by transporting wind generated by the wind-generating vanes 20b of the cutting blades 20, and released to the lateral outside of the mower deck 30 from the cut grass discharge opening.

In order to create the transporting wind by the wind-generating vanes 20b of the cutting blades 20, air enters from a gap between the lower end of the side wall 32 of the mower deck 30 and the ground. In order to use the flow of this air that enters into the mower deck 30 for cooling of the electric motor 4 and the inverter unit 50, the opening 301 created between the rear side wall 322 and the support frame 343 is important. Due to rotational driving of the cutting blades 20, air enters from the lower end of the rear side wall 322 through the opening 301 after passing through the periphery of the electric motor 4 and the inverter unit 50, and a transporting wind is created.

In FIGS. 3 to 5, the electric motor 4, the inverter unit 50, and the power transmission mechanism 7 are shown exposed, but actually they are covered by a cover that is not shown.

As shown in FIG. 7, a left motor 81 that is an electric driving motor that rotationally drives the left rear wheel 2a, and a right motor 82 that is an electric driving motor that rotationally drives the right rear wheel 2b, are mounted in the grass mower. The rotational speeds of the left motor 81 and the right motor 82 each independently change according to the amount of electrical power supplied through a running inverter unit 52.

Thus, it is possible to cause the rotational speeds of the left rear wheel 2a and the right rear wheel 2b to differ, and the direction of the grass mower is changed by the difference between the rotational speeds of the left rear wheel 2a and the right rear wheel 2b. In this embodiment, a running drive mechanism 53 is provided for power transmission between the left motor 81 and the left rear wheel 2a, and between the right motor 82 and the right rear wheel 2b. Note that in a case where the left motor 81 and the right motor 82 are in-wheel motors, it is possible to omit the running drive mechanism 53.

As shown in FIG. 7, the controller 6 controls power supply to the left motor 81 and the right motor 82 for running, the electric motor 4 serving as the cutting blade motor, and the electric cooling pump 45.

Figure 8:
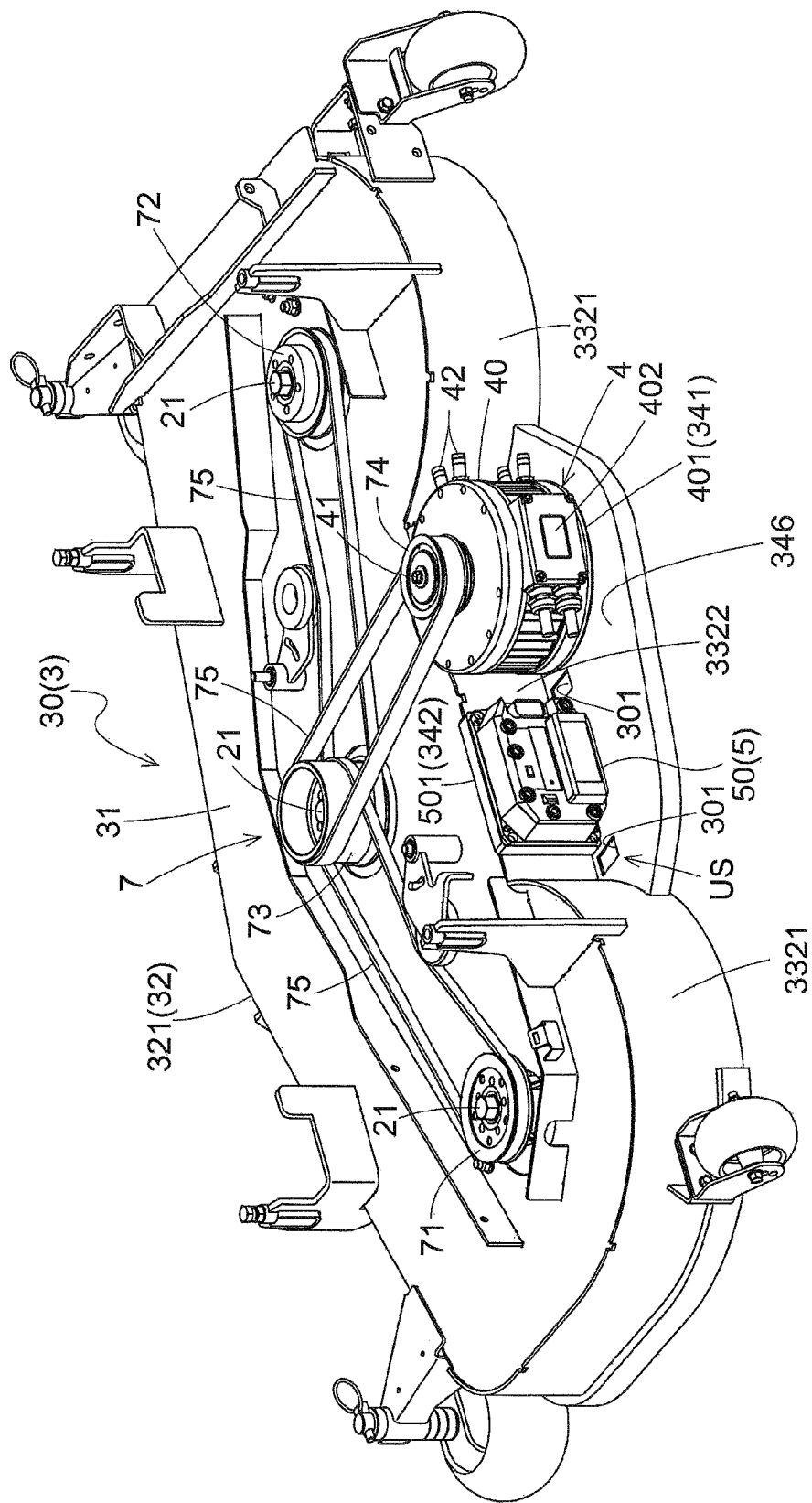
FIG. 8 is a perspective view showing another embodiment of the mower unit.

Other Embodiments (1) FIG. 8 shows another embodiment related to the structure of the mower deck 30, specifically the structure of the mounting base 34.

In FIG. 8, the mounting base 34 is provided as a sub-deck used to configure the rear portion of the mower deck 30.

That is, the mounting base 34 is substantially provided with a mounting plate 346 extending horizontally rearward from the straight portion 3322 of the rear side wall 322 between the left-side circular arc portion 3321 and the right-side circular arc portion 3321 of the rear side wall 322, and the rear side wall 322.

The motor mounting face 401 configured to be mounted to the mower deck 30 is provided at the lower end portion of the electric motor 4. The motor mounting face 401 has a lower ground height than the ceiling wall 31 of the mower deck 30. The mounting plate 346 is provided with the first mounted face 341 configured to fit closely with the motor mounting face 401 of the motor housing 40.

In this other embodiment, the second mounted face 342 configured to fit closely with the inverter mounting face 501 of the inverter unit 50 is provided in the straight portion 3322 of the rear side wall 322. That is, the inverter unit 50 is mounted to the side wall 32 of the mower deck 30. Therefore, the inverter unit 50 is mounted to the wall face of the rear side wall 322. In this other embodiment, the second mounted face 342 is provided in the side wall 32 of the mower deck 30. The second mounted face 342 extends in the vertical direction. The inverter mounting face 501 is fixed in a state in contact with the second mounted face 342 such that heat can be conducted.

In this case as well, the motor mounting face 401 makes surface contact with the first mounted face 341, and the inverter mounting face 501 makes surface contact with the second mounted face 342. Thus, the mower deck 30 as a whole functions as a heat sink of the electric motor 4 and the inverter unit 50.

The opening 301 is provided in the mounting plate 346. Air that is sucked into the mower deck 30, generated by rotational driving of the cutting blades 20, flows through the vicinity of the electric motor 4 and the inverter unit 50.

(2) In the above-described embodiments, the inverter unit 50 is disposed in the mower deck 30, but instead, the inverter unit 50 may be disposed in the vehicle body 10.

(3) In the above-described embodiments, an example is given of the mower unit 3 having three of the cutting blades 20 disposed side-by-side, but instead, the mower unit 3 may have four or more of the cutting blades 20 disposed side-by-side, or two of the cutting blades 20 disposed side-by-side.

(4) In the above-described embodiments, an example is given of a mid-mount-type grass mowing running vehicle in which the mower unit 3 is disposed between the front wheel unit 1 and the driving wheel unit 2, which is a rear wheel unit, but this is not a limitation. For example, the vehicle may also be a front-mower-type grass mowing running vehicle in which the mower unit 3 is disposed forward of the front wheel unit 1.

(5) In the above-described embodiments, an example is given of a so-called zero-turn-type vehicle in which the left rear wheel 2a and the right rear wheel 2b of the driving wheel unit 2 can be driven independently, but this is not a limitation. For example, the vehicle may have the left rear wheel 2a and the right rear wheel 2b linked by a differential mechanism, so that the rear wheels can be driven in conjunction with each other.

What is claimed is:

1. A grass mower, comprising:
a vehicle body;
a raising/lowering mechanism;
a mower deck installed to the vehicle body so as to be capable of changing ground height through the raising/lowering mechanism, the mower deck having a ceiling wall;
a first rotating shaft extending upward through the ceiling wall;
a second rotating shaft extending upward through the ceiling wall on one lateral side of the first rotating shaft relative to the vehicle body;
a third rotating shaft extending upward through the ceiling wall on the other lateral side of the first rotating shaft relative to the vehicle body;
a first cutting blade linked to the first rotating shaft;
a second cutting blade linked to the second rotating shaft;
a third cutting blade linked to the third rotating shaft;
an electric motor mounted within the mower deck at a location outside of respective rotation paths of the first, second and third cutting blades, the electric motor having an output shaft extending upward; and
a belt transmission mechanism positioned above the ceiling wall, and configured to transmit power from the output shaft to the first, second and third rotating shafts, the belt transmission mechanism including:
a driving pulley provided at an upper end of the output shaft,
a first driven pulley provided at an upper end of the first rotating shaft,
a second driven pulley provided at an upper end of the second rotating shaft,
a third driven pulley provided at an upper end of the third rotating shaft,
a first belt wound around the first driven pulley and the second driven pulley,
a second belt wound around the first driven pulley and the third driven pulley, and
a third belt wound around the first driven pulley and the driving pulley, the third belt extending at a higher level than the first belt and the second belt,
wherein the mower deck has a rear side wall extending from an outer circumferential edge of the ceiling wall,
wherein an opening is defined at a lower portion of the rear side wall adjacent the electric motor to allow an air flow sucked in by the cutting blades to pass therethrough and cool the electric motor, and
wherein a mounting base extends horizontally from the rear side wall through the opening to the outside of the mower deck, the electric motor being disposed on the mounting base.

2. The grass mower according to claim 1,
wherein a motor mounting face configured to be mounted to the mower deck is provided at a lower end portion of the electric motor, and
the motor mounting face has a lower ground height than the ceiling wall.

3. The grass mower according to claim 1,
wherein a horizontal first mounted face is provided in the mounting base, and
the motor mounting face is in contact with the first mounted face such that heat can be conducted.

4. The grass mower according to claim 1, further comprising:
a power supply unit configured to supply electrical power to the electric motor;
wherein an inverter unit is provided in the power supply unit, and
the inverter unit is mounted to the rear side wall or the mounting base.

5. The grass mower according to claim 4,
wherein an inverter mounting face configured to be mounted to the mower deck is provided in the inverter unit,
a second mounted face is provided in the rear side wall or the mounting base, and
the inverter mounting face is fixed in a state in contact with the second mounted face such that heat can be conducted.

6. The grass mower according to claim 4,
wherein a battery configured to be provided in the vehicle body is provided in the power supply unit,
the grass mower further comprising a connector unit of a power cable configured to connect the inverter unit to the battery, the connector unit being installed to the mounting base.

7. The grass mower according to claim 1,
wherein the mounting base is disposed at the periphery of a location where sucked-in air produced by rotation of the first, second and third cutting blades flows.

8. The grass mower according to claim 1,
wherein in an area rearward of the rear side wall, a usable space is provided bordered by a plurality of circular arc portions following the rotation path and a straight portion between the circular arc portions, and
the electric motor is disposed in the usable space.

9. The grass mower according to claim 1,
wherein a water jacket is provided in the electric motor, and
an electric cooling pump configured to supply cooling water to the water jacket is provided in the vehicle body.

10. The grass mower according to claim 4,
wherein a cooling water channel is provided in the inverter unit, and
an electric cooling pump configured to supply cooling water to the cooling water channel is provided in the vehicle body.

11. The grass mower according to claim 1,
wherein the first driven pulley comprises a triple-layer pulley, the third belt being wound around an uppermost layer pulley of the triple-layer pulley.

12. The grass mower according to claim 1, wherein the opening is a recess that is defined at a lower edge of the mower deck to be opened downward.

\* \* \* \* \*